United States Patent [19]

Rushforth et al.

[11] Patent Number: 4,908,836
[45] Date of Patent: Mar. 13, 1990

[54] METHOD AND APPARATUS FOR DECODING MULTIPLE BIT SEQUENCES THAT ARE TRANSMITTED SIMULTANEOUSLY IN A SINGLE CHANNEL

[75] Inventors: Craig K. Rushforth, Kaysville; Zhenhua Xie; Robert T. Short, both of Salt Lake City, all of Utah

[73] Assignee: Unisys Corporation, Blue Bell, Pa.

[21] Appl. No.: 255,809

[22] Filed: Oct. 11, 1988

[51] Int. Cl.⁴ .............................................. H04K 1/00
[52] U.S. Cl. ............................................ 375/1; 370/19; 370/18
[58] Field of Search ............... 375/1, 96, 99, 101, 375/103; 364/724.11, 728.01, 724.12, 728.05; 370/95, 3, 19, 18

[56] References Cited

U.S. PATENT DOCUMENTS

| | | | |
|---|---|---|---|
| 4,470,138 | 9/1984 | Gutleber | 370/18 |
| 4,611,333 | 9/1986 | McCallister et al. | 375/1 |
| 4,651,327 | 3/1987 | Fujita | 375/1 |
| 4,672,605 | 6/1987 | Hustig et al. | 375/1 |
| 4,755,983 | 7/1988 | Masak et al. | 375/96 |

Primary Examiner—Benedict V. Safourek
Assistant Examiner—Christopher O. Edwards
Attorney, Agent, or Firm—Charles J. Fassbender; Robert S. Bramson

[57] ABSTRACT

Data bits are decoded from a composite signal that is formed by coding multiple bit sequences with respective spreading codes, and transmitting the coded bit sequences simultaneously and asynchronously over a single channel in which the bit sequences are added. This decoding involves a metric in combination with a repetitive decision process which is only linearly dependent on the number of bit sequences in the composite signal.

10 Claims, 6 Drawing Sheets

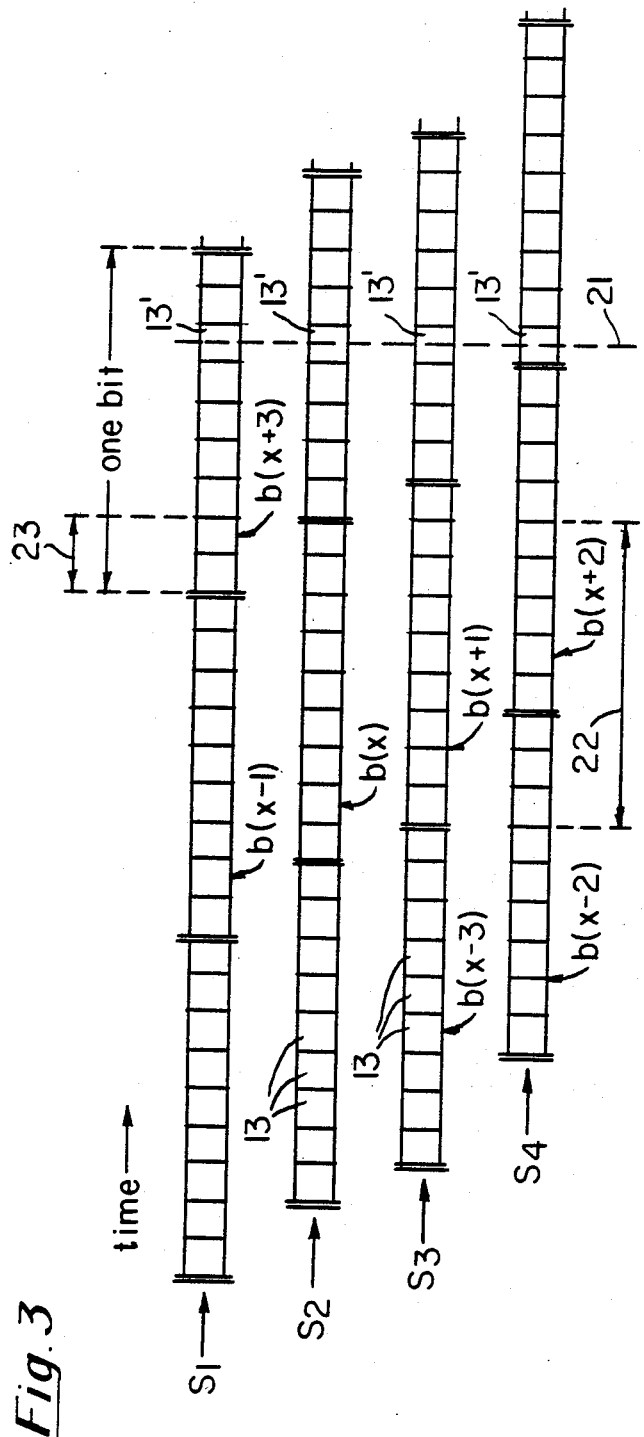

Fig. 6

$b_1 = -1, -1, -1, -1, -1, -1, -1, \cdots$ $b_2 = 1, 1, 1, 1, 1, 1, 1, \cdots$ $b_3 = -1, -1, 1, 1, -1, -1, 1, \cdots$ $b_4 = -1, 1, -1, 1, -1, 1, -1, \cdots$ time →

$y_1 = -0.906, -0.375, \cdots$ $y_2 = 0.798, 1.015, \cdots$ $y_3 = -0.876, -1.135, \cdots$ $y_4 = -1.116, 0.713, \cdots$

|  | S1 | S2 | S3 | S4 |
|---|---|---|---|---|
| $H(x, x-3)$ | $8.51(10^{-2})$ | 0.0 | $8.50(10^{-2})$ | $-0.11$ |
| $H(x, x-2)$ | 0.0 | $-3.84(10^{-2})$ | $1.94(10^{-2})$ | $-1.92(10^{-2})$ |
| $H(x, x-1)$ | $5.55(10^{-2})$ | 0.0 | 0.0 | 0.0 |
| $H(x, x+1)$ | 0.0 | 0.0 | 0.0 | $5.55(10^{-2})$ |
| $H(x, x+2)$ | $1.94(10^{-2})$ | $-1.92(10^{-2})$ | 0.0 | $-3.84(10^{-2})$ |
| $H(x, x+3)$ | $-0.11$ | $8.51(10^{-2})$ | $8.51(10^{-2})$ | $8.50(10^{-2})$ |

METHOD AND APPARATUS FOR DECODING MULTIPLE BIT SEQUENCES THAT ARE TRANSMITTED SIMULTANEOUSLY IN A SINGLE CHANNEL

BACKGROUND OF THE INVENTION

This invention relates to communication systems; and more particularly, it relates to methods and apparatus for decoding multiple bit sequences that are transmitted simultaneously and asynchronously to a receiving station over a single channel in which the bit sequences are added.

Conventionally, when multiple bit sequences are transmitted at the same time to a receiver, each of the bit sequences is transmitted on a separate channel. In that case, the bit sequences of the separate channels do not interfere with each other. Thus the receiving station can simply filter the signals that are in one channel from the signals that are in the other channels. However, such a system has an inherent deficiency in that it requires multiple communication channels, which in certain instances are not available.

By comparison, with the present invention, multiple bit sequences are sent simultaneously to a receiver over a single channel. In this channel, the bit sequences are added together and thereby form a composite signal which is what the receiver sees. Thus, it is the task of the receiver to decode or recover the bit sequences from which the composite signal was formed.

This decoding problem is addressed in a prior art paper entitled "Minimum Probability of Error for Asynchronous Gaussian Multiple Access Channels" by S. Verdu, *IEEE Transactions on Information Theory*, IT-32, pp. 85–96, January 1986. In that paper, a decoding procedure is presented which uses a bank of K matched filters (where K is the number of bit sequences that are simultaneously transmitted in the composite signal), followed by a metric evaluation process. However, the Verdu procedure requires a total of $2^K$ metric calculations for each bit in the composite signal that is decoded; and such exponential dependence on the number of bit sequences in the composite signal makes the Verdu decoder too complex to implement, even for a moderate number of users.

Accordingly, a primary object of the present invention is to provide another decoding procedure, as well as circuitry for carrying out that procedure, which is only linearly dependent on the number of bit sequences that are in the composite signal.

BRIEF SUMMARY OF THE INVENTION

Using the present invention, data bits are decoded from a composite signal that is formed by coding K bit sequences with respective spreading codes, and transmitting the coded bit sequences simultaneously and asynchronously over a single channel in which the bit sequences are added. This decoding, in accordance with the invention, includes the following steps:

(1) comparing the content of several registers, each of which contains a particular bit sequence and a metric for that sequence, to determine the largest metric $M_{max}$ and the corresponding bit sequence $b_s$;

(2) evaluating a new pair of metrics for the very next bit $b(x)$ which follows the bit sequence $b_s$ by using estimated "0" and "1" values for bit $b(x)$, K-1 bits from the sequence $b_s$ which immediately precede bit $b(x)$, and matched filter outputs for K-1 bits in the composite signal which immediately follow bit $b(x)$; and (3) replacing the register which contains the bit sequence $b_s$ with two registers, one of which contains the bit sequence $b_s b(x)=0$ and the metric $M_{max}$ plus the above evaluated metric for $b(x)=0$, and the other of which contains the bit sequence $b_s b(x)=1$ and the metric $M_{max}$ plus the above evaluated metric for $b(x)=1$.

Steps 1, 2, and 3 are repeated multiple times; and thereafter, the composite signal is decoded as the bit sequence in the register which contains the largest metric. With this method, a sequence of N bits in the composite signal will, on average, be decoded by performing steps 1, 2, and 3 a total of N times.

BRIEF DESCRIPTION OF THE DRAWINGS

Various features and advantages of the invention are described herein in conjunction with the accompanying drawings wherein:

FIG. 3 illustrates how the multiple bit sequences in the FIG. 1 system are combined to form a composite signal at the receiving station;

FIG. 4 gives a preferred metric for the receiver in the FIG. 1 system to use in decoding the composite signal;

FIG. 6 gives actual bit sequences and spreading codes that were used to form a composite signal in a computer simulation of the disclosed decoding procedure;

FIG. 7 gives matched filter outputs and cross correlations which resulted from the computer simulation of the FIG. 6 bit sequences;

DETAILED DESCRIPTION OF THE INVENTION

Figure 1:
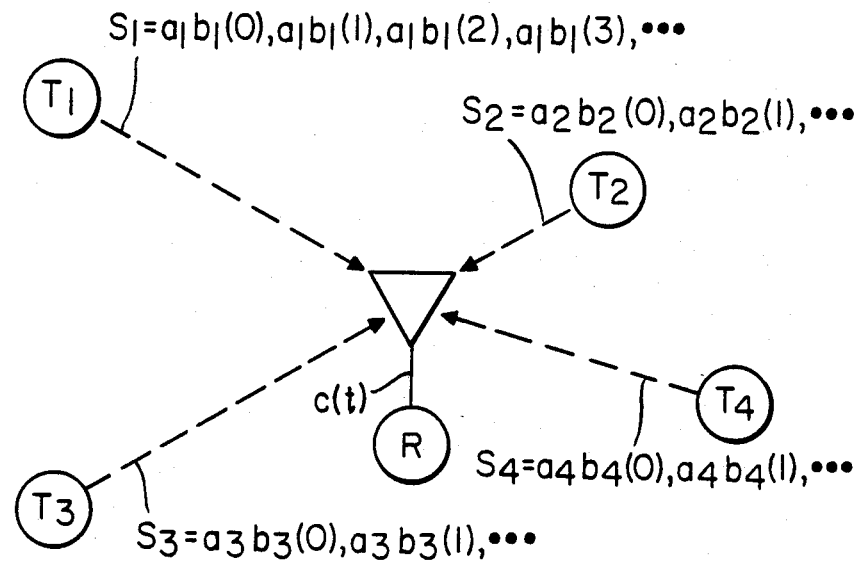
FIG. 1 illustrates a communication system in which the present invention is incorporated.

Referring now to FIG. 1, it shows an overall view of a communications system in which the invention is used. In this illustrated communications system, there are four transmitting stations $T_1$, $T_2$, $T_3$, and $T_4$ and one receiving station R. Each station may be housed within any suitable mechanism, such as an airplane or satellite, for example.

Station $T_1$ communicates with station R by sending a coded sequence of data bits which is indicated in FIG. 1 as a sequence $s_1$. In that sequence, the symbols $b_1(0)$, $b_1(1)$, $b_1(2)$, $b_1(3)$, . . . represent uncoded data bits, and the symbol $a_1$ represents a spreading code which is multiplied by each of the uncoded data bits prior to their transmission.

Similarly in FIG. 1, the symbols $s_2$, $s_3$, and $s_4$ respectively indicate coded bit sequences which are sent by the transmitting stations $T_2$, $T_3$ and $T_4$. Each bit in signal $s_2$ is multiplied by a spreading code $a_2$; each bit in signal $s_3$ is multiplied by a spreading code $a_3$; and each bit in signal $s_4$ is multiplied by a spreading code $a_4$.

Figure 2:
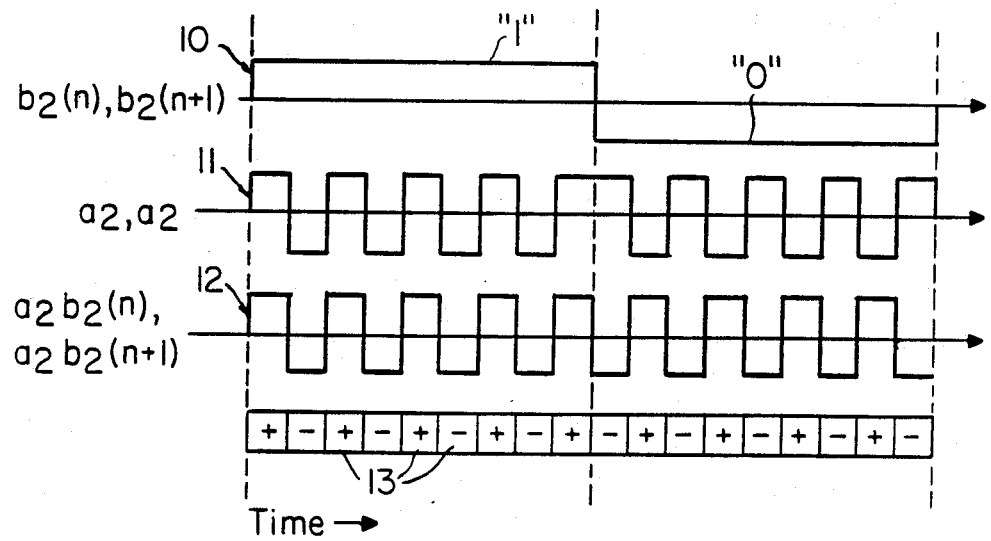
FIG. 2 illustrates the details of one of the bit sequences in the FIG. 1 system.

A detailed example of two successive bits from station $T_2$ is illustrated in FIG. 2. Curve 10 shows the voltage waveform of the bits $b_2(n)$ and $b_2(n+1)$ from station $T_2$ prior to their coding; and curve 11 shows the voltage waveform of the spreading code $a_2$ for each of those bits. In this example, bit $b_2(n)$ is a "1" and bit $b_2(n+1)$ is a "0". Multiplying voltage waveform 10 by voltage waveform 11 produces a voltage waveform 12, which is the coded bits $a_2b_2(n)$ and $a_2b_2(n+1)$.

Inspection of curve 12 shows that each of the coded bits is comprised of a sequence of chips 13; and, the voltage of each chip is either +1 or −1 volts. In FIG. 2, there are nine chips per bit. A coded "1" bit is a nine chip sequence which is the same as the spreading code $a_2$, and a coded "0" bit is a nine chip sequence which is the negative of the spreading code $a_2$.

Turning now to FIG. 3, it shows how the coded bit sequences from the four transmitting stations $T_1$ thru $T_4$ overlap in time. Here again, each bit from a transmitting station is indicated by a sequence of nine chips 13. Each of the coded bit sequences $s_1$ thru $s_4$ is sent asynchronously with respect to the other sequences. FIG. 3, as an example, shows a two chip delay between the sequences $s_1$ and $s_2$, a one chip delay between the sequences $s_2$ and $s_3$, and a three chip delay between the sequences $s_2$ and $s_4$.

All of the coded bit sequences $s_1$ thru $s_4$ are transmitted to the receiving station R over a single channel. Thus station R receives a composite signal c(t) which is the sum of the individual bit sequences (plus any noise that is in the same frequency spectrum as the bit sequences). For example, in FIG. 3, the composite signal during a time instant 21 is formed by the sum of four different chips 13'. Each of those chips 13' can be +1 volt or −1 volt; and thus, the resulting composite signal buries or masks the bits that are in the individual sequences $s_1$ thru $s_4$.

Note that for the purpose of simplicity, all of the FIG. 3 signals are shown at baseband. However, to actually transmit the signals $s_1$, $s_2$, $s_3$ and $s_4$ to the receiving station, it is to be understood that they would be modulated in the transmitting stations by a carrier frequency, broadcast and added at that carrier frequency, and demodulated to baseband in the receiving station.

Now in the receiving station R, a decision process and an associated metric is used to recover or decode the individual bits from the composite signal. By a metric is herein meant a combination of certain measurable features of the composite signal which indicate whether a particular bit in the composite signal is a "0" or a "1". One preferred metric, $M_x$, is given in FIG. 4; and the symbols in the metric are defined as follows:

(1) Bit b(x) is any arbitrary bit of interest (i.e., the xth bit) in the composite signal.

(2) Bit b(x−1) is the bit which immediately precedes bit b(x) in the composite signal; bit b(x−2) is the bit which immediately precedes bit b(x−1); etc. Also, K is the number of bit sequences in the composite signal (i.e., - the number of transmitting stations).

(3) y(x) is the output of a matched filter which is matched to the spreading code for bit b(x). This filter is reset when bit b(x) in the composite signal starts to pass through the filter and the output y(x) occurs one bit time later.

(4) y(x+1), y(x+2), etc., are similar to y(x) with x being replaced with x+1, x+2, etc. For example, y(x+1) is the output of a matched filter which is matched to the spreading code for bit (x+1). This filter is reset when bit b(x+1) in the composite signal starts to pass through the filter and the output occurs one bit time later. Bit b(x+1) is the bit which immediately follows bit b(x) in the composite signal.

(5) H(x,x+1) is the cross correlation between the spreading codes for bits b(x) and b(x+1) over the time period that bits b(x) and b(x+1) overlap. For example, in FIG. 3, H(x,x+1) is the cross correlation between the spreading codes $a_2$ and $a_3$ during the time period 22; and it is obtained by multiplying together the spreading codes for bits b(x) and b(x+1) and integrating the result during time period 22.

(6) H(x,x+2), H(x,x+3), etc. are similar to H(x,x+1) with x+1 being replaced with x+2, x+3, etc. For example, in FIG. 3, H(x,x+3) is the cross correlation between the spreading codes $a_2$ and $a_1$ during the time period 23.

(7) W(x) is the power level at the receiver of the coded bit sequence which includes bit b(x); and $N_o$ is the power level at the receiver of any noise that happens to be in the same channel as the coded bit sequence.

Figure 5:
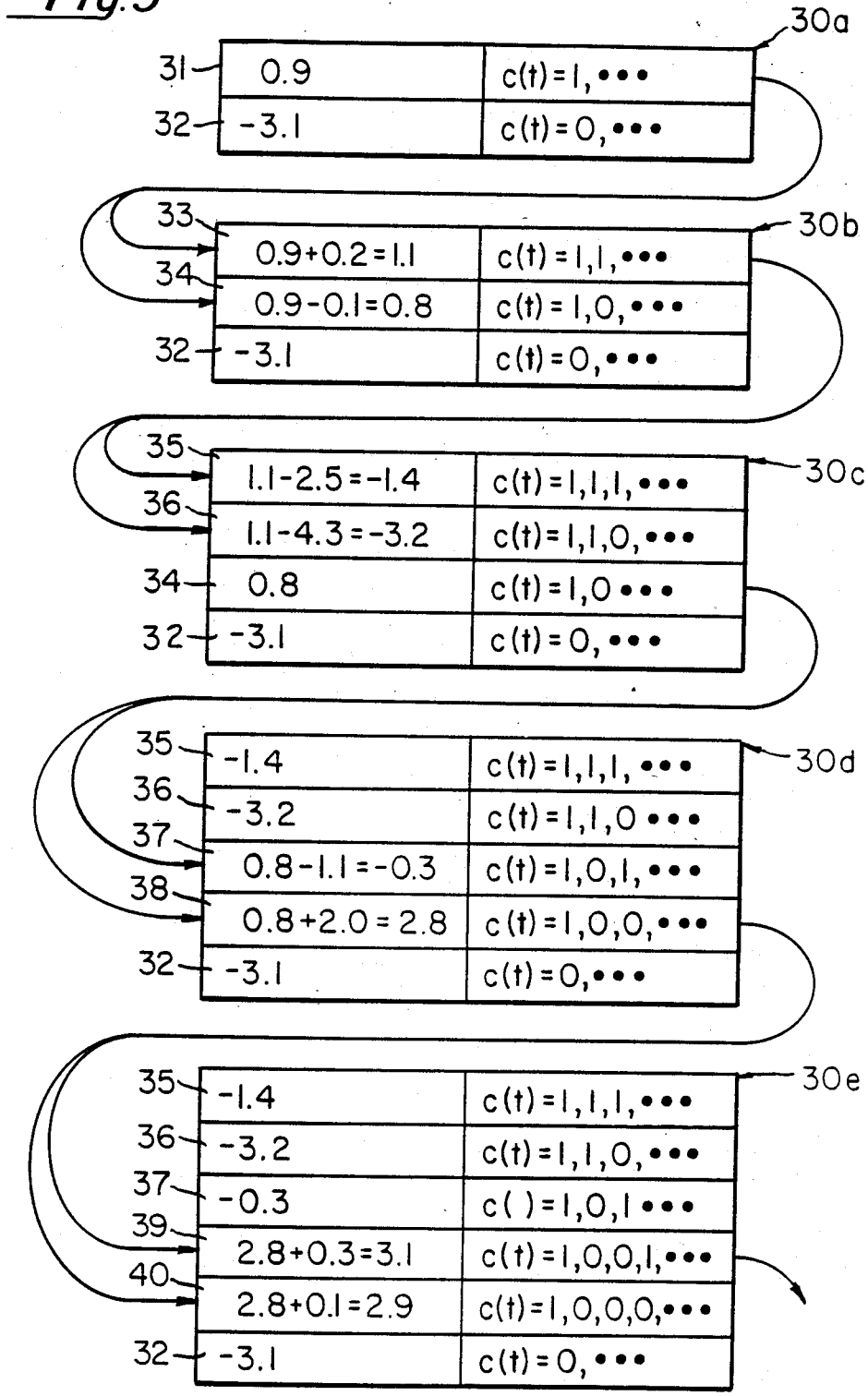
FIG. 5 illustrates the sequence by which the FIG. 4 metric is used by the receiving station to decode the composite signal.

Considering now FIG. 5, it illustrates the process steps by which the receiving station uses the FIG. 4 metric $M_x$ to decode the individual bits in the composite signal c(t). To begin, the receiving station R twice evaluates the metric $M_1$ of the very first bit b(1).

In one of those evaluations, bit b(1) is assumed to be a logical "0" or −1 volt, while in the other evaluation, bit b(1) is assumed to be a logical "1" or +1 volt. In both of those metric evaluations, the matched filter outputs of bit b(1) and the next successive K−1 bits are used.

As an example of this step, FIG. 5 shows a stack 30a having registers 31 and 32. Register 31 contains in its left half the value of the FIG. 4 metric that was produced when bit b(1) was assumed to be a logical "1"; while register 32 contains in its left half the value of the FIG. 4 metric that was produced when bit b(1) was assumed to be a logical "0". Note that these metric values, as well as all of the other metric values in FIG. 5 which are described below, are given just as an example in order to show the sequence by which the FIG. 4 metric is used. In other words, these values are not the result of putting actual matched filter outputs, cross correlations, etc., into the FIG. 4 metric. That is done later in conjunction with FIGS. 6-8.

Thereafter, the receiving station examines the metric values in stack 30a to determine which one is the larger. Then, it twice evaluates the FIG. 4 metric for bit b(2) using two assumed values for b(2) and the value of bit b(1) which produced the larger entry in stack 30a. In the FIG. 5 example, bit b(1) equal to a "1", produced the larger metric; and thus a pair of metrics for bit b(2) is evaluated assuming bit sequences b(1)b(2) of 1,1 ... and 1,0 ... respectively. Also, in performing this pair of metric calculations, the matched filter outputs for bit b(2) and the next successive K−1 bits are used.

Then, the receiving station replaces the largest entry in stack 30a with two new entries. They are shown in registers 33 and 34 in stack 30b. Register 33 contains the sum of the metric in register 31 and the newly calculated metric of bit b(2) assuming a b(1)b(2) sequence of 1,1. Register 33 contains the sum of the metric in register 31 and the newly calculated metric of bit b(2) assuming a b(1)b(2) sequence of 1,0.

In the example of FIG. 5, the metric of bit b(2) is shown as 0.2 when bits b(1)b(2) are assumed to be 1,1. Thus, register 33 contains 0.9+0.2 or 1.1. Similarly in the example of FIG. 5, the metric of bit b(2) is shown as −0.1 when bits b(1)b(2) are assumed to be 1,0. Thus register 34 contains 0.9+0.1 or 0.8.

Thereafter, the receiving station examines the metric values in stack 30b to determine the largest metric entry and the corresponding bit sequence. Then the receiving station evaluates a pair of metrics for the next bit which follows that same bit sequence. One of those metrics is evaluated by assuming that the next bit is a "1", and the other metric is evaluated by assuming that the next bit is a "0". Then the largest metric entry in stack 30b is replaced with two new entries,—one of which is the largest entry plus the new metric that was obtained by assuming the next bit is a "1", and the other of which 5 is the largest entry plus the new metric that was obtained by assuming the next bit is a "0".

In the example of FIG. 5, the largest metric entry in stack 30b is in register 33. That entry corresponds to a bit sequence b(1)b(2) of 1,1. Thus the receiving station proceeds by evaluating the FIG. 4 metric for bit b(3) using the sequence b(1)b(2)b(3)=1,1,1; and it evaluates the FIG. 4 metric for bit b(3) using the sequence b(1)b(2)b(3)=1,1,0. In FIG. 5, these two new metrics are shown in registers 35 and 36 of stack 30c as having values of −2.5 and −4.3 respectively. Register 35 contains the metric of register 33 plus the above-evaluated metric of −2.5; and register 36 contains the metric of register 33 plus the above-evaluated metric of −4.3.

Next, the receiving station examines stack 30c to determine that the largest metric entry is 0.8, and that the 0.8 metric is produced by a bit sequence of b(1)b(2)=1,0. Thus the receiving station proceeds by evaluating the FIG. 4 metric for the next bit b(3). In this evaluation, it first assumes a bit sequence b(1)b(2)b(3) of 1,0,1; and then it assumes a bit sequence b(1)b(2)b(3) of 1,0,0. In the FIG. 5 example, this produces bit b(3) metrics of −1.1 and 2.0 respectively. Then the 0.8 metric entry in stack 30c is replaced with two new entries in registers 37 and 38 of stack 30d. Register 37 contains 0.8 plus the above evaluated metric of −1.1; and register 0.8 contains 0.8 plus the above evaluated metric of 2.0.

Subsequently, the receiving station examines stack 30d to determine the largest metric entry is 2.8, and that such entry is produced by assuming a bit sequence of b(1)b(2)b(3) of 1,0,0. Thus the receiving station proceeds by twice evaluating the FIG. 4 metric for the next bit b(4). In this evaluation, a bit sequence b(1)b(2)b(3)b(4) of 1,0,0,1 is assumed, and then a bit sequence of 1,0,0,0 is assumed. In the FIG. 5 example, this produces metrics of 0.3 and 0.1 respectively; and they are indicated in registers 39 and 40 of stack 30e. Register 39 holds 2.8+0.3, and it corresponds to a bit sequence b(1)b(2)b(3)b(4) of 1,0,0,1; while register 40 holds 2.8+0.1, and it corresponds to a bit sequence b(1)b(2)b(3)b(4) of 1,0,0,0.

By repeating the above process steps over and over, the bit sequences in the stack will grow in length. And, at any one time, the receiving station decodes the composite signal c(t) as containing that bit sequence which has the largest metric in the stack.

Turning now to FIGS. 6 and 7, they show the details of a computer simulation that was performed on the above process. In this simulation, station $T_1$ transmitted the FIG. 6 bit sequence $b_1$; station $T_2$ transmitted the FIG. 6 bit sequence $b_2$; etc. Also in this simulation, each bit from station $T_1$ was coded with the FIG. 6 spreading code $a_1$ prior to transmission; each bit from station $T_2$ was coded with the FIG. 6 spreading code $a_2$ prior to transmission; etc. Further in this simulation, the asynchronous time delay between the bit sequences from stations $T_1$ and $T_2$, $T_3$ and $T_3$, $T_3$ and $T_4$ were each one chip; W(x) was set to a value of one for all x, and $N_o$ was set to a value of 0.1.

Figure 8:
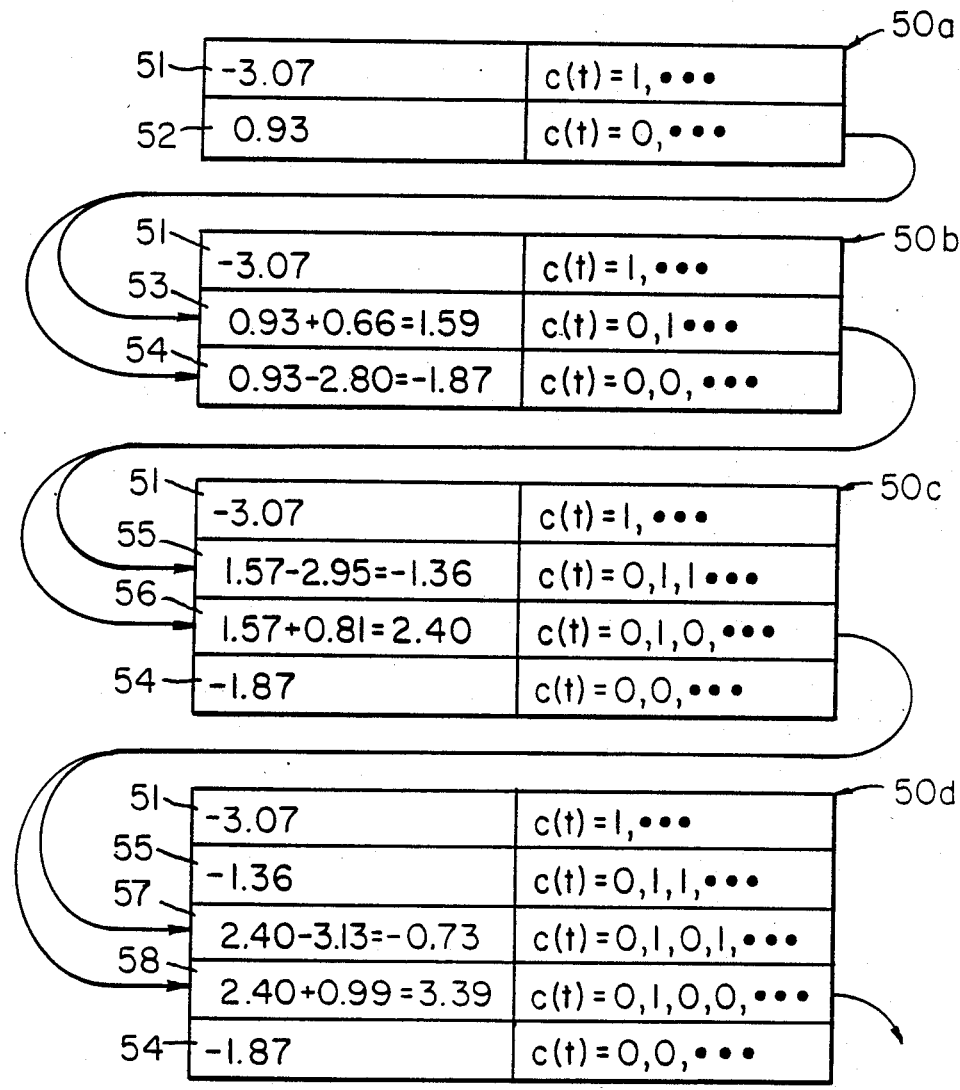
FIG. 8 shows the remaining portion of the decoding procedure that was computer simulated in accordance with FIGS. 4 and 5.

Using the above parameters, the actual matched filter outputs were determined by the computer to be as shown in FIG. 7. Also, the cross-correlation functions for the spreading codes were determined by the computer to be as shown in FIG. 7. Then, in accordance with FIGS. 4 and 5, the metrics were processed using assumed "1" and "0" values for certain bits and the FIG. 7 matched filter outputs and cross correlations. FIG. 8 shows the results of that simulation.

In FIG. 8, the stack 50a contains registers 51 and 52. Register 51 holds the value of the FIG. 4 metric when bit b(1) is assumed to be a "1", and register 52 holds the value of the FIG. 4 metric when bit b(1) is assumed to be a "0". Since the entry in register 52 is larger than the entry in register 51, the FIG. 4 metric is next evaluated for bit b(2) using the b(1)b(2) bit sequences of 0,1 and 0,0.

Evaluating the FIG. 4 metric for the bit sequence b(1)b(2) of 0,1 yielded a value of 0.66, and adding that value to the register 52 metric yielded the register 53 metric in stack 50b. Similarly, evaluating the FIG. 4 metric for the b(1)b(2) sequence of 0,0 yielded a value of −2.80, and that value is added to the metric of register 52 to produce the metric in register 54 of stack 50b.

Comparing now all of the metric entries in stack 50b shows that register 53 contains the largest entry. Its corresponding bit sequence is b(1)b(2)=0,1; and thus, a pair of metrics for the next bit b(3) is calculated with the preceding bits b(1)b(2) being set equal to 0,1. Those metric evaluations produced the entries in registers 55 and 56 in stack 50c. In register 55, the term −2.95 is the metric of bit b(3) for the bit sequence b(1)b(2)b(3)=0,1,1; and in register 56, the term 0.81 is the metric of bit b(3) for the bit sequence b(1)b(2)b(3)=0,1,0.

Comparing the metrics in stack 50c shows that register 56 contains the largest one. That metric corresponds to a bit sequence b(1)b(2)b(3) of 0,1,0; and thus a pair of metrics is calculated for the next bit b(4) of that sequence. Those metrics are given in registers 57 and 58 of stack 50d.

Inspection of the metric in stack 50d shows that the largest metric is in register 58. It has a corresponding bit sequence of 0,1,0,0. And, comparing that sequence to the first four bits in FIG. 6 shows that they are identical. Thus, the first four bits in the composite signal have been decoded without error.

Figure 9:
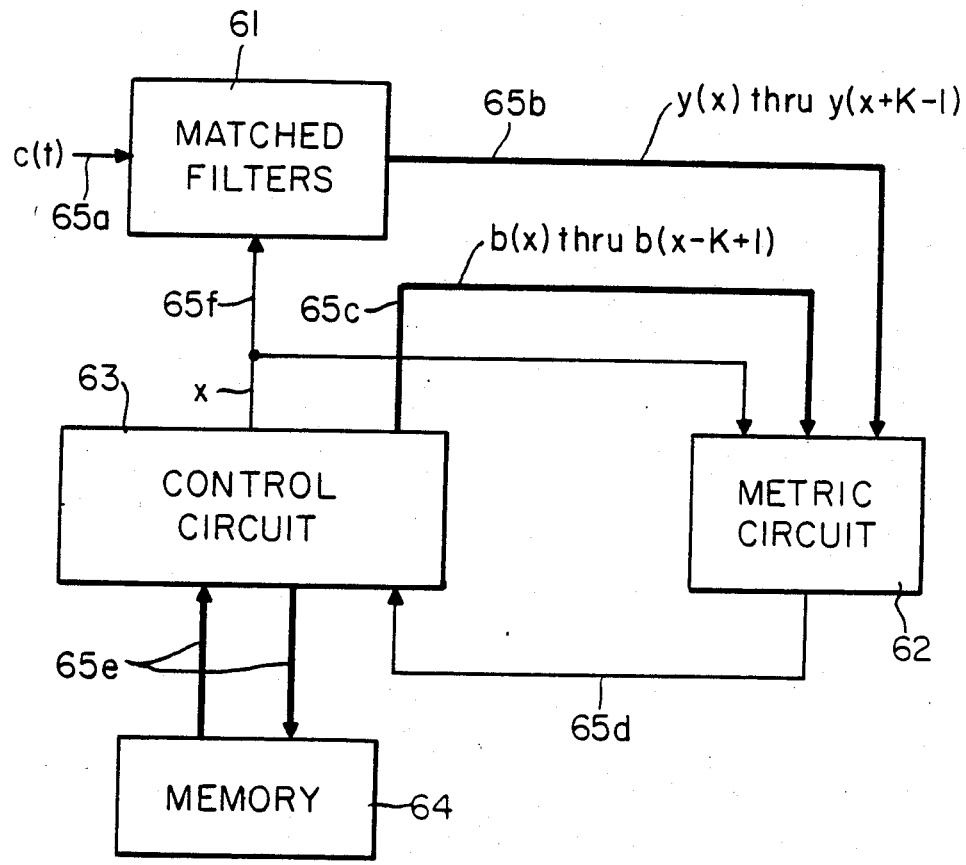
FIG. 9 shows a decoder which performs the decoding process of FIGS. 4 and 5.

Turning now to FIG. 9, it shows an electronic module for performing the above decoding of the composite signal. This module includes a set of matched filters 61, a metric calculating circuit 62, a control circuit 63, and a memory 64. All of these circuits are interconnected via conductors 65a thru 65f as shown.

In operation, the matched filters 61 receive and filter the composite signal c(t) on conductor 65a. There, the matched filter outputs are also stored until they are requested by the control circuit 63. To make a request, circuit 63 places the index "x" on conductor 65f, and in response, the matched filter outputs y(x) thru y(x+K−1) are sent on the conductors 65b to the metric circuit 62. At the same time, the control circuit 63 generates certain assumed values for bits b(x) thru b(x−K+1) on the conductors 65c which also go to the metric circuit 62. Then, circuit 62 evaluates the metric of FIG. 4 using the particular values for the various terms that are on the conductors 65b, 65c, and 65f. That result is generated on conductor 65d where it is received by the control circuit 63. Circuit 63 utilizes the metric on conductor 65d to update a stack in memory 64 in accordance with the sequence shown and described in FIGS. 5 and 8. Circuit 63 then compares the stack entries to determine which has the largest metric and its corresponding bit sequence. Based on that determination, circuit 63 then generates a new index of "x" and new bits b(x) thru b(x−K+1) on conductors 65f and 65c respectively.

Figure 10:
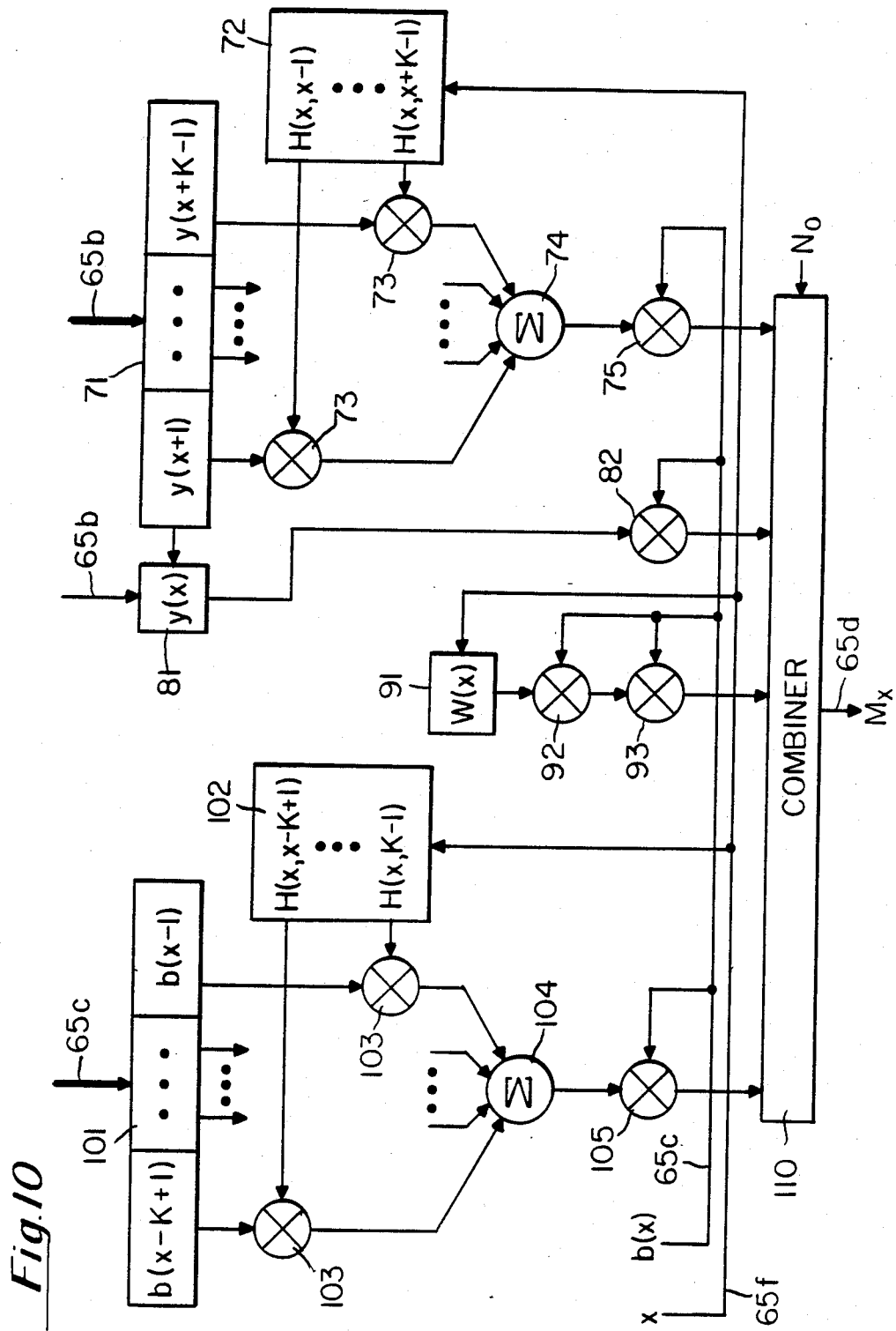
FIG. 10 shows additional details of the metric circuit in the FIG. 9 decoder.

Considering now FIG. 10, it shows the details of the metric circuit 62. One section of this circuit is comprised of a register 71 which has K−1 stages, a memory 72 which stores the autocorrelation functions $H(x,x+1)$ thru $H(x,x+K−1)$, a set of K−1 multipliers 73, an adder 74, and another multiplier 75. All of these components are interconnected as illustrated, and they operate to generate the term $I_f(x)$ in the FIG. 4 metric.

Another section of the FIG. 10 circuit includes a one-stage register 81, and a multiplier 82. Those components are interconnected as illustrated, and they generate the term $2b(x)y(x)$ of the FIG. 4 metric.

Another section of the FIG. 10 circuit includes a memory 91 which stores the power level of the individual bit sequences in the composite signal, and a pair of multipliers 92 and 93. Components 91-93 are interconnected as illustrated, and they form the term $b^2(x)w(x)$ of the FIG. 4 metric.

Further included in the FIG. 10 circuit is a register 101 which has K−1 stages, a memory 102 which stores the autocorrelation functions $H(x,x−K+1)$ thru $H(x,x−1)$, a set of K−1 multipliers 103, an adder 104, and another multiplier 105. All of these components 101-105 are interconnected as illustrated, and they form the term $I_p(x)$ in the FIG. 4 metric.

In operation, the controller 63 generates assumed values for bits b(x) thru b(x−K+1) on the leads 65c, and the matched filters 61 generate actual filter outputs for bits b(x) thru b(x+K-31 1) on the leads 65b. Those values are then operated on by components 71 thru 75, 81 thru 82, 91 thru 93, and 101 thru 105 to form the above described metric terms. Circuit 110 combines those terms, as well as the noise term $N_0 \ln 2$, in accordance with FIG. 4; and it sends the resulting metric $M_x$ to the control circuit 63 on the leads 65d.

A preferred process of decoding bits in a composite signal in accordance with the invention, as well as circuitry for carrying out that process, have now been described in detail. In addition, however, many changes and modifications can be made to those details without departing from the nature and spirit of the invention.

For example, many suitable implementations of the matched filters exist. One such implementation consists of a two input multiplier and a one input integrator for each filter. Signal c(t) goes into one of the multiplier inputs; the spreading code of a particular transmitting station goes into the other multiplier input; the multiplier output goes to the integrator input; and the output of the integrator is the matched filter output.

Also in the disclosed process, several modifications can be made to the FIG. 4 metric. For example, in the FIG. 4 metric the term $I_f(x)$ compensates for the interference to bit b(x) which is caused by the next successive K−1 bits in the composite signal. But, as the amount of correlation between the spreading codes for bit b(x) and a successive bit decreases, the amount of interference also decreases. Consequently, one or more of the terms [sign y(x+i)H(x,x+i)] which have the smallest correlations H(x,x+i) can be dropped from the interference term $I_f(x)$ in order to simplify the metric, at the risk of increasing the errors that occur in the decoding procedure.

For example, consider the leftmost column in FIG. 7 which shows the correlations H(x,x+i) where bit b(x) comes from station $T_1$. There, $H(x,x+2)$ is $1.94 \times 10^{-2}$, whereas $H(x,x+3)$ is almost ten times larger. Consequently, the term [sign y(x+2)H(x,x+2)] in the FIG. 4 metric can be dropped whenever bit b(x) is from station $T_4$.

Similarly, one or more of the terms b(x−i)H(x,x−i) can be dropped from the interference term $I_p(x)$. For example, the rightmost column of FIG. 7 shows that a relatively small correlation exists between the spreading codes of bits b(x) and b(x−2); and thus the term b(x−2)H(x,x−2) can be dropped from the FIG. 4 metric whenever b(x) is from station $T_4$.

Further, the constants by which the interference terms $I_p(x)$ and $I_f(x)$ are multiplied in the FIG. 4 metric can be increased or decreased to modify the relative weight or importance of the terms in the decoding process. In addition, the noise term $-N_0 \ln 2$ in the FIG. 4 metric can be modified. For example, by changing it to $d_{min} - W(x) - N_0 \ln 2$ where $d_{min}$ is the minimum distance between the various spreading codes of the transmitting stations, fewer decoding errors will occur in the case in which multi-user interference is strong (i.e., where $d_{min} < \text{MIN } W(x)$).

Accordingly, it is to be understood that the invention is not limited to the above details, but is defined by the appended claims.

What is claimed is:

1. A method of decoding superimposed data bits including the steps of:

receiving a composite signal that is formed by coding multiple bit sequences with respective spreading codes and transmitting the coded bit sequences simultaneously and asynchronously over a single channel;

comparing the content of several registers, each of which contains an estimate of a particular bit sequence in said composite signal and a metric for that sequence, to determine the largest metric $M_{max}$ and the corresponding bit sequence $b_s$;

evaluating a new pair of metrics for the very next bit b(x) in said composite signal which follows said bit sequence $b_s$ by using estimated "0" and "1" values for bit b(x), bits from said sequence $b_s$ which immediately precede bit b(x), and matched filter outputs for bits in said composite signal which immediately follow bit b(x);

replacing the register which contains said bit sequence $b_s$ with two registers, one of which contains the bit sequence $b_s$ b(x)=0 and the metric $M_{max}$ plus the above evaluated metric for b(x)=0, and the other of which contains the bit sequence $b_s$ b(x)=1 and the metric $M_{max}$ plus the above evaluated metric for b(x)=1;

repeating said comparing, evaluating, and replacing steps multiple times; and thereafter, decoding said composite signal as the bit sequence in the register which contains the largest metric.

2. A method according to claim 1 wherein each metric of said pair that is evaluated for bit b(x) includes an estimated value for bit b(x) times a matched filter output for bit b(x), minus an interference term $I_f$ which contains the matched filter outputs of the K−1 bits that immediately follow bit b(x), and minus an interference term $I_p$ which contains K−1 bits from the sequence $b_s$, where K is the number of bit sequences in said composite signal.

3. A method according to claim 2 wherein said term $I_f$ is of the form $$I_f = \sum_{i=x+1}^{x+k-1} [\text{sign } y(i)] H(x,i),$$

where y(i) is the matched filter output for bit b(i), and H(x,i) is the cross correlation between the spreading codes for bits b(x) and b(i) over the period that bits b(x) and b(i) overlap in said composite signal.

4. A method according to claim 3 wherein said term $I_p$ is of the form $$I_p = \sum_{i=x-1}^{x-k+1} b(i) H(x,i)$$

where H(x,i) is the cross correlation between the spreading codes for bits b(x) and b(i) over the period that bits b(x) and b(i) overlap in said composite signal.

5. A method according to claim 4 wherein said metric for bit b(x) includes the terms $2b(x)y(x) - b^2(x)W(x) - 2b(x)I_p(x) - 2b(x)I_f(x) - N_0 \ln 2$ where W(x) is the power level of bit b(x) and $N_o$ is the power level of any noise in the composite signal.

6. A method according to claim 5 wherein said composite signal is transmitted over said channel via radio waves.

7. A method according to claim 5 wherein said composite signal is transmitted over said channel via an electrical conductor.

8. A decoder for decoding superimposed data bits comprising:

a plurality of filters, which are coupled to receive and filter a composite signal that is formed by coding multiple bit sequences with respective spreading codes and transmitting the coded bit sequences simultaneously and asynchronously over a single channel, with each filter being matched to a respective one of said spreading codes;

a computing means for evaluating a metric for any bit b(x) in said composite signal which includes an estimated value for bit b(x), an estimate of a sequence of bits $b_s$ which immediately precede bit b(x), and matched filter outputs for several bits in said composite signal which immediately follow bit b(x);

a plurality of register means, each of which is for holding a respective metric and a corresponding bit sequence; and a control means for repeatedly (a) examining said registers to determine its largest metric $M_{max}$ and corresponding bit sequence $b_s$, (b) directing said computing means to compute a new pair of metrics for the bit sequences $b_s b(x) = 0$ and $b_s b(x) = 1$, and (c) replacing the register which contains said bit sequence $b_s$ with two registers, one of which contains the bit sequence $b_s b(x) = 0$ and the metric $M_{max}$ plus the above evaluated metric for b(x)=0, and the other of which contains the bit sequence $b_s b(x) = 1$ and the metric $M_{max}$ plus the above evaluated metric for b(x)=1.

9. A decoder according to claim 8 wherein said computing means evaluates a metric for bit b(x) which includes an estimated value for bit b(x) times a matched filter output for bit b(x), minus an interference term $I_f$ which contains the matched filter outputs of the K−1 bits that immediately follow bit b(x), and minus an interference term $I_p$ which contains K−1 bits from the sequence $b_s$, where K is the number of bit sequences in said composite signal.

10. A decoder according to claim 9 wherein said terms $I_f$ and $I_p$ are of the form $$I_f = \sum_{i=x+1}^{x+k-1} [\text{sign } y(i)] H(x,i)$$

and $$I_p = \sum_{i=x-1}^{x-k+1} b(i) H(x,i)$$

where y(i) is the matched filter output for bit b(i), and H(x,i) is the cross correlation between the spreading codes for bits b(x) and b(i) over the period that bits b(x) and b(i) overlap in said composite signal.

* * * * *